INVENTOR.
HARRY E. MOORE
BY JACK E. SCHMITT
Sanford Schumacher
ATTORNEY.

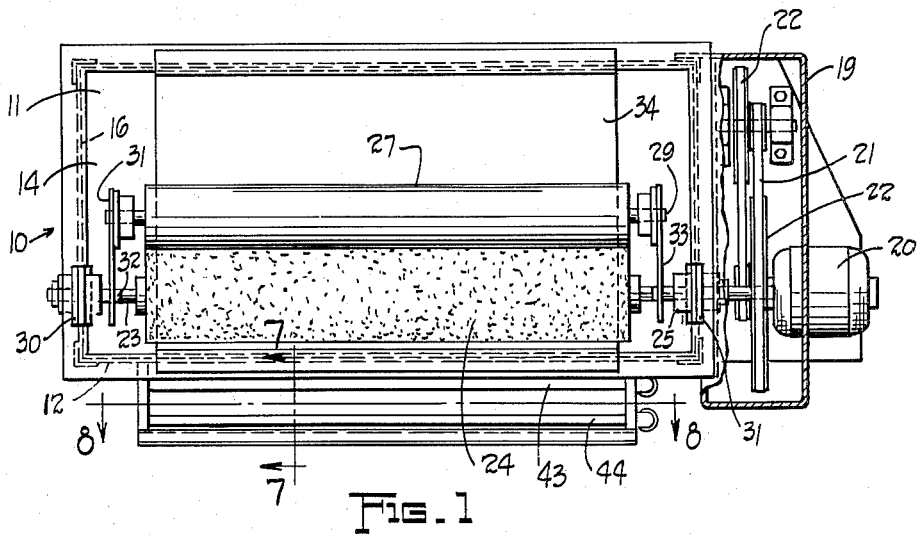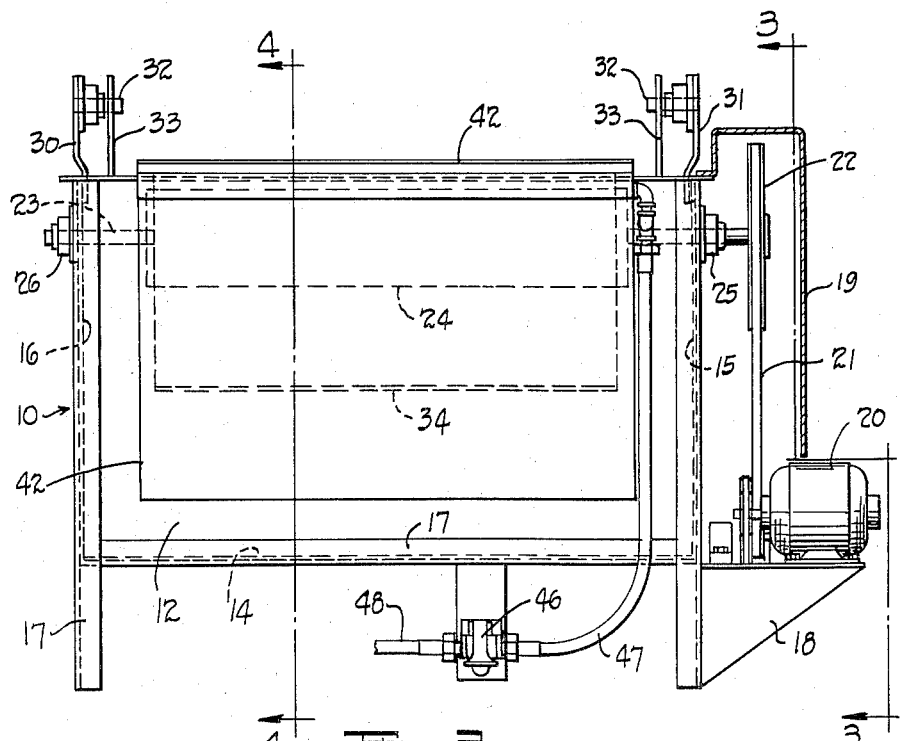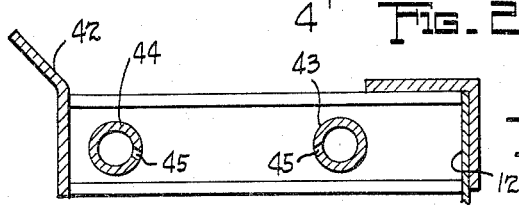

# 2,971,208

APPARATUS FOR SCRUBBING AUTOMOBILE FLOOR MATS

Harry E. Moore, 1860 Dover Center Road, Westlake, Ohio, and Jack E. Schmitt, 28412 W. Oviatt Road, Bay Village, Ohio Filed June 6, 1958, Ser. No. 740,292

1 Claim. (Cl. 15—40)

This invention relates to scrubbing machines and particularly to machine for scrubbing automobile floor mats.

Conducive to a better understanding of the invention it may be well to point out that there are establishments for automatically washing the exterior of automobiles within a relatively short time, that is within a period of from 3 to 5 minutes. These so-called "Minute Wash" units employ a conveyor chain to which the automobile is temporarily attached and which moves the automobile through successive flooding, washing, scrubbing, rinsing and air-blast drying stations.

However the interior of the body and especially the front compartment floor mats, which usually accumulate the most dirt, must be manually cleaned. Such mats usually have ribbed or waffle patterned, non-slip, surfaces which are difficult to clean free of grit and sand within the short time alloted to each washing operation. If additional time is taken for this operation the whole conveyor line must be stopped or slowed up.

The primary object of this invention, therefore, is to provide a washing and scrubbing machine for automobile floor mats.

Another object is to provide such a machine that both washes and dries the mat.

A further object is to provide a device of the type stated that is entirely self-contained and which may be made portable if desired.

Still another object is to provide a mat washer in which the mat may be held at especially dirty portions, for thorough removal of caked dirt, and then released into the wash liquid for instant return to the surface thereof, within easy reach of the operator.

Another object is to provide a device of the type stated having an air-blast compartment into which the washed wet mat may be inserted for instant drying.

These and other objects of the invention will become apparent from a reading of the following specification and claim, together with the accompanying drawings, wherein like parts are referred to and indicated by like reference numerals, and wherein:

Figure 1 is a top plan view of the automobile floor mat scrubber, that is the subject of this invention, with portions broken away to show the interior of the brush driving compartment;

Figure 2 is a front elevation of the same;

Figure 7 is an enlarged cross sectional view of the drying compartment air ducts, taken along the line and in the direction of the arrows 7—7 of Figure 1.

Figure 3:
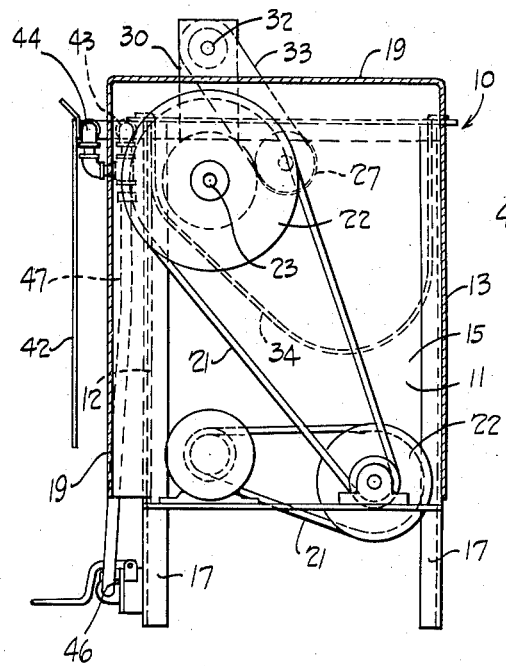
Figure 3 is a right end view of the device taken along the line and in the direction of the arrows 3—3 of Figure 2.

Referring more particularly to the drawings there is seen the apparatus for scrubbing automobile floor mats, that is the subject of this invention, broadly indicated by reference numeral 10.

The device comprises a substantially rectangular tank 11 adapted to hold washing liquid, mounted within an angle-iron frame 17. The frame 17 may have plain legs, as illustrated or may be equipped with rollers, if desired, so that the unit may be easily moved from place to place. The tank 11 has front, rear, bottom and end walls, 12, 13, 14, 15 and 16, respectively. The tank is fabricated from suitable corrosion resistant sheet metal, or may be given a protective coating of paint or similar material if made of sheet iron or steel.

Figure 4:
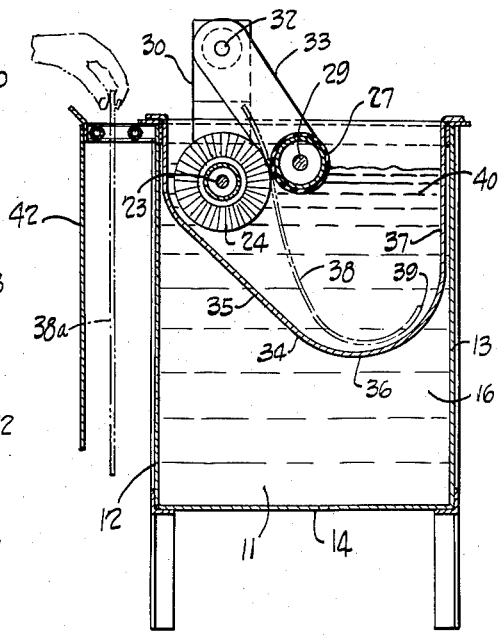
Figure 4 is a vertical sectional view taken along the line and in the direction of the arrows 4—4 of Figure 2.
Figure 5:
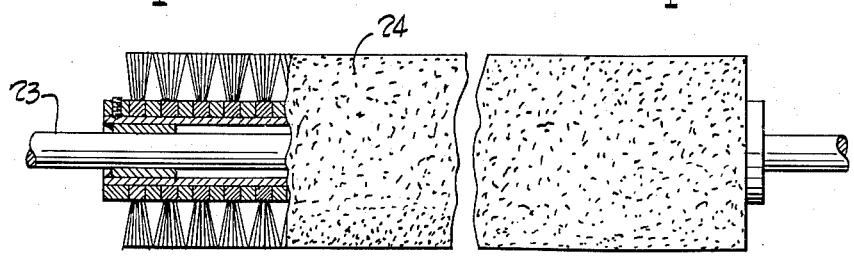
Figure 5 is a top plan view, partly in section, of the unmounted cylindrical scrubber brush.
Figure 6:
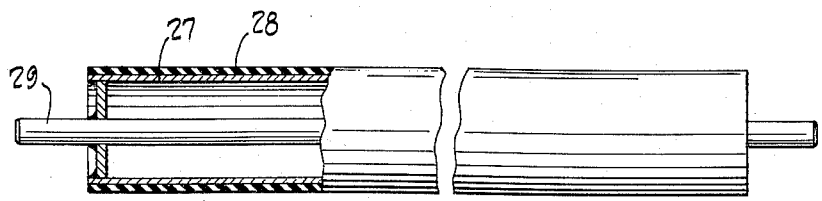
Figure 6 is a top plan view, partly in section of the unmounted idler roller.
Figure 8:
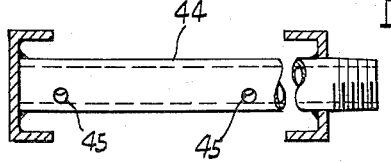
Figure 8 is a longitudinal view of one of the air ducts taken along the line and in the direction of the arrows 8—8 of Figure 1.

The tank is adapted to be filled with a suitable washing liquid 40, as seen in Figure 4, and is provided with suitable drainage means, not shown, for the easy removal of dirty liquid.

Reference numeral 24 indicates a cylindrical scrubber brush which extends the width of the tank 11 proximate the front wall 12 thereof. In the preferred form illustrated the brush 24 is 30" long and has an outside diameter of 6" and inside diameter of 2". The brush 24 is made up of a plurality of standard ringed bristle sections, as is common practice, mounted on a shaft 23.

The brush shaft 23 is journaled in bearing boxes 25 and 26 mounted on the end walls 15 and 16 respectively, as is seen most clearly in Figure 4 the shaft 23 is located below the surface 41 of the washing liquid 40 so that the brush 24 runs partially submerged in the washing liquid.

The brush 24 is driven by an electric motor 20 mounted on a bracket 18 and enclosed in a housing 19. The motor is connected to the brush shaft 23 through a suitable speed reducing train of pulleys 22 and belts 21, as is seen most clearly in Figure 3.

Two brackets 30 and 31 support an idler roller 27 which rides on the brush 24, through link arms 33 and pivot pins 32. The idler roller 27 comprises a tube, mounted on a shaft 29, and having a rubber coated, smooth outer surface 28. The roller 27 extends the length of the brush 24 and is gravity biased thereagainst.

Reference numeral 34 indicates a sheet metal tray which extends between the front and rear walls of the tank 11. The width of the tray is approximately that of the brush 24, beneath which it is positioned, as seen in Figures 1, 2, 3 and 4. The tray 34 is spaced from the end walls 15 and 16 so that any dirt accumulated thereon will be flushed off and dropped to the bottom of the tank. Thus the mat will always be washed in sediment free water.

The tray is attached to the front wall 12 of the tank 11 immediately ahead of the brush 24, as is seen most clearly in Figure 4. The tray extends under the brush in a downwardly extending portion 35. At the approximate center of the tank the tray takes an upwardly curved course 36 which terminates at the rear wall 13 of the tank above the surface 41 of the contained liquid 40.

A sheet metal panel 42 is mounted in parallel spaced relation outwardly of the front wall 12 of the tank 11 to form a mat drying compartment open to the top. The bottom may be left open, or closed to hold the water blown off the wet mats as described hereinafter. If the bottom of the drying compartment is closed suitable drainage facilities must be provided for periodic emptying of the collected liquid.

Two parallel air ducts or pipes 43 and 44 are mounted in the drying chamber, proximate the open top edge thereof. These ducts are connected to a foot operated air valve 46 through supply pipe 47. The valve 46 is connected to a source of compressed air through pipe 48. The source of compressed air may be remote, or a compressor unit may be mounted on the tank frame to make the unit truly self-contained.

The air ducts 43 and 44 are spaced apart a distance such that a floor mat can be passed between the ducts 43 and 44, when the mat is held in a vertical position, as indicated by reference numeral 38a in Figure 4.

The ducts 43 and 44 have a plurality of air vents 45 located in their opposing faces. These vents 45 are suitably spaced to provide a uniform sheet of compressed air the length of the ducts, and are preferably directed downward at an angle of 45° as is indicated most clearly in Figure 7. In the preferred form the air vents 45 have a diameter of .041".

To operate the scrubber the motor 20 is started which in turn causes the scrubber brush 24 to revolve in the washing solution 40. A dirty mat 38 is held in the hand of the operator in a vertical position above the point of contact between the rotating brush 24 and the idler roller 27. The leading edge 39 of the mat 38 is inserted between the brush and roller. The revolving brush tends to pull the mat down into the washing liquid 40, but since the roller 27 is an idler and not power driven the mat can be easily held in the hand against the downward pull of the driven brush 24. As long as the mat is held immovable the rotating brush 24 will thoroughly scrub that portion of the mat in contact with the brush face, free of all dirt, grit and mud. The idler roller being gravity biased against the brush 24 will hold the mat in contact with the revolving bristles, resisting any tendency on the part of the mat to move out of contact with the brush. Since the roller 27 has a smooth surface its rotation will not add to the downward pull of the brush so that the mat may be easily hand held.

The mat is slowly moved downward past the revolving scrubber 24, which cleans its entire surface. It is also possible to pull the mat up and down so that the cleaning action may be repeated as often as necessary. After the mat is cleaned the operator lets go of it, so that it passes completely into the liquid. The so released mat is supported by the tray 34 and as it moves there-along from the revolving brush 24 toward the rear wall 13 of the tank its leading edge 39 is directed upward to the surface 41 of the liquid 40 by the curvature of the rear section 36 of the tray 34 as seen in Figure 4.

This leading edge 39 may easily be grasped by the operator and the wet mat lifted from the tank in a vertical plane.

The vertically suspended mat is then brought forward to the drying compartment and passed between the air ducts 43 and 44 as indicated by reference numeral 38a in Figure 4. At the same time the foot operated air control valve 46 is opened thereby admitting compressed air to the ducts 43 and 44. The compressed air flowing out of the vents 45 is impinged against both sides of the mat 38a and blows the water off the wet mat, rendering it substantially dry in a few seconds, as the mat is repeatedly raised and lowered between the air vents.

If the dirty floor mats are removed from an automobile as it starts along the conveyor chain, the hereindescribed device will provide cleaned and dry mats for replacement within the car by the time it reaches the end of the "minute-wash" cycle.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

We claim:

Apparatus for scrubbing automobile floor mats, comprising in combination, a substantially rectangular sheet material tank for holding washing liquid having bottom, front, rear, and end walls, and an open top, a smoothly curved false bottom suspended between the front and rear walls, spaced from the end walls, and inclined downward from a point proximate the front wall toward the center of the tank, and then curved upward to the top edge of the rear wall, a motor driven cylindrical scrubber brush journaled between the end walls of the tank proximate the downwardly inclined front end of the false bottom, and a smooth surfaced idler roller pivotally mounted adjacent the scrubber brush and gravity biased thereagainst, at the liquid surface.

References Cited in the file of this patent

UNITED STATES PATENTS

| | | |
|---|---|---|
| 23,081 | Dole | Mar. 1, 1859 |
| 32,150 | Shepard | Apr. 23, 1861 |
| 40,821 | Cooper | Dec. 8, 1863 |
| 78,067 | Crawford | May 19, 1868 |
| 511,985 | Woodcock et al. | Jan. 2, 1894 |
| 962,803 | Vierling | June 28, 1910 |

FOREIGN PATENTS

| | | |
|---|---|---|
| 117,378 | Germany | Feb. 4, 1901 |
| 749,864 | France | May 15, 1933 |